United States Patent [19]

Takahashi

[11] Patent Number: 4,663,778
[45] Date of Patent: May 5, 1987

[54] COMMUNICATION APPARATUS

[75] Inventor: Masatomo Takahashi, Kawasaki, Japan

[73] Assignee: Canon Kabushiki Kaisha, Tokyo, Japan

[21] Appl. No.: 694,318

[22] Filed: Jan. 24, 1985

[30] Foreign Application Priority Data

Jan. 31, 1984 [JP] Japan ................................. 59-14401

[51] Int. Cl.⁴ .......................................... H04M 11/08
[52] U.S. Cl. .................................................... 379/100
[58] Field of Search .................... 179/2 R, 2 DP, 2 A

[56] References Cited

U.S. PATENT DOCUMENTS

| 3,962,546 | 6/1976 | Hashimoto | 179/2 DP |
| 4,041,242 | 8/1977 | Churchill | 179/2 A |
| 4,340,783 | 7/1982 | Sugiyama et al. | 179/2 A |
| 4,471,489 | 9/1984 | Konetski et al. | 179/2 DP |

Primary Examiner—James L. Dwyer
Attorney, Agent, or Firm—Fitzpatrick, Cella, Harper & Scinto

[57] ABSTRACT

A communication apparatus such as a facsimile machine switches an auto-receive mode and a manual receive mode by a time and an off-hook detection during a ringing period.

10 Claims, 16 Drawing Figures

Fig. 6

| ADDRESS AREA A | START TIME | END TIME | RINGING PERIOD |
|---|---|---|---|
| 1 | 00:00 | 08:00 | 10 SEC |
| 2 | 08:00 | 12:00 | 30 SEC |
| 3 | 12:00 | 13:00 | 10 SEC |
| 4 | 13:00 | 20:00 | 30 SEC |
| 5 | 20:00 | 24:00 | 10 SEC |

Fig. 10

| ADDRESS AREA A | START TIME | END TIME | COMM MODE |
|---|---|---|---|
| 1 | 00:00 | 08:00 | 0 |
| 2 | 08:00 | 12:00 | 1 |
| 3 | 12:00 | 13:00 | 0 |
| 4 | 13:00 | 20:00 | 1 |
| 5 | 20:00 | 24:00 | 0 |

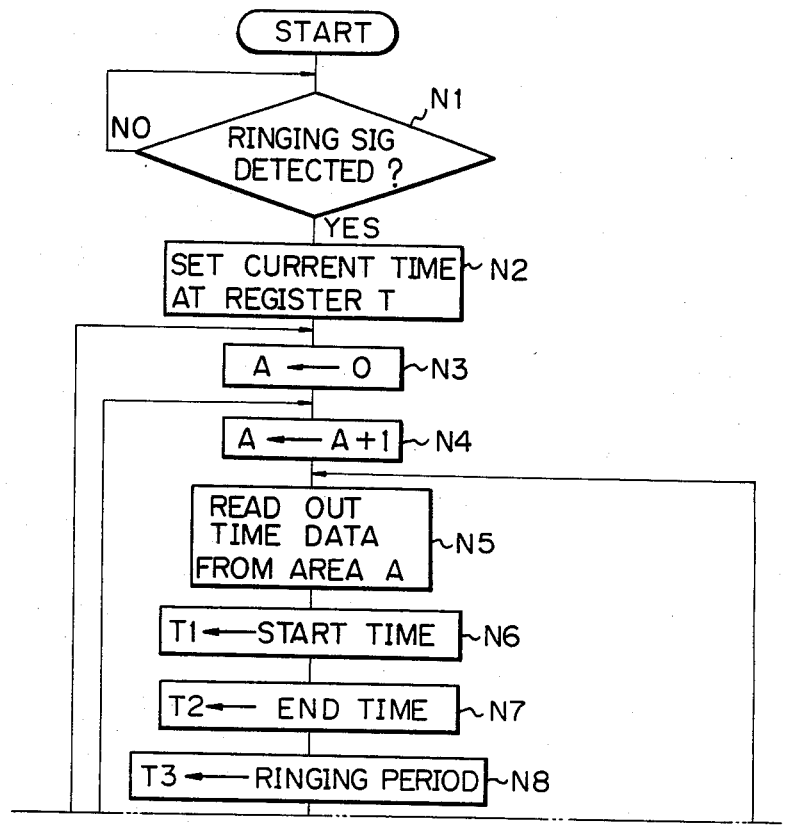

COMMUNICATION APPARATUS

BACKGROUND OF THE INVENTION

1. Field of the Invention

The present invention relates to a communication apparatus.

2. Description of the Prior Art

In prior art apparatus of this type such as a facsimile machine having an auto-receive function, a telephone set cannot be used for telephone communication in an auto-receive mode because the telephone line is connected to the facsimile machine. Therefore, in order to allow the use of the telephone set for telephone communication, an operator switches the auto-receive mode and a manual receive mode by a switch arranged on a console panel. However, when the manual receive mode and the auto-receive mode are manually selected (for example, the manual receive mode is selected during a time period in which the telephone communication is frequently effected and the auto-receive mode is selected when the operator is absent), the auto-reception of a text may not be performed if the manual receive mode is operational by misswitching of the operator or the telephone communication may not be performed if the auto-receive mode is operational.

SUMMARY OF THE INVENTION

It is an object of the present invention to provide a communication apparatus which can effectively share one telephone line with a telephone set.

It is another object of the present invention to provide a communication apparatus which can positively switch a receive mode.

It is another object of the present invention to provide a communication apparatus which can always utilize a telephone set for telephone communication.

BRIEF DESCRIPTION OF THE DRAWINGS

FIG. 6 shows a memory map, FIGS. 7, 7a, 7b shows a detailed flow chart of FIG. 2, FIGS. 8, 8a, 8b shows a flow chart showing a control procedure of another embodiment of the present invention, FIG. 10 shows a memory map.

DETAILED DESCRIPTION OF THE PREFERRED EMBODIMENTS

In the following description of the preferred embodiments of the present invention, a facsimile machine is particularly explained.

Figure 1:
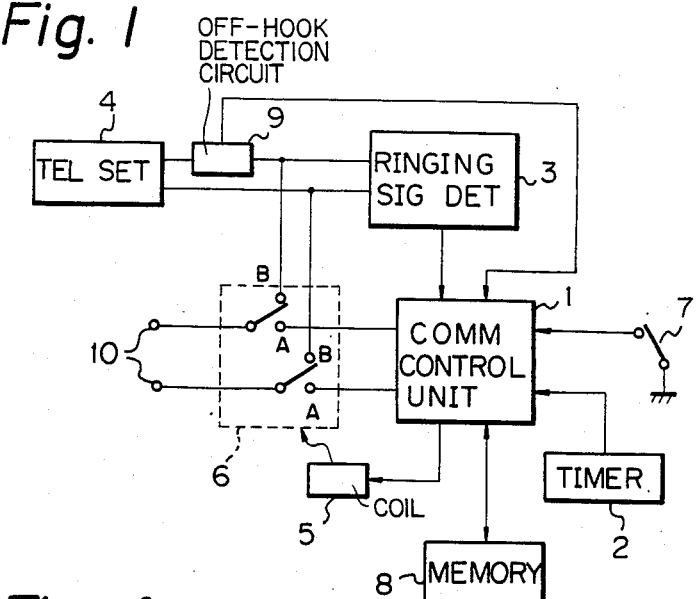
FIG. 1 is a block diagram of one embodiment of a facsimile machine in accordance with the present invention.

FIG. 1 is a block diagram of one embodiment of a facsimile machine in accordance with the present invention. Numeral 10 denotes input/output (I/O) terminals to which a telephone line is connected. The I/O terminals 10 are connected to neutral terminals of a relay 6.

The relay 6 is driven by a coil 5 to switch the telephone line connected to the I/O terminals 10 to the facsimile machine (terminal A) or a telephone set 4 (terminal B).

A communication control unit 1 is connected to the terminal A of the relay 6. The communication control unit 1 comprises a microprocessor and peripheral equipment such as a modem and a count-down counter and primarily functions to control a communication procedure and switch the line.

On the other hand, the telephone set 4 is connected to the terminal B of the relay 6. A known off-hook detection circuit 9 is connected in a signal line to the telephone line 4, and when a handset of the telephone set 4 is off-hook, a detection signal is sent from the off-hook detection circuit 6 to the communication control unit 1.

A known ringing signal detection circuit 3 is connected to the terminal B of the relay 6. When a ringing signal is applied from the telephone line, the circuit 3 detects it and sends a detection signal to the communication control unit 1.

A clock 2 is connected to the communication control unit 1 for a control to be described later. The clock 2 may be a hardware timer or a software timer. The clock information of the clock 2 is read by the communication control unit 1.

A memory 8 and a switch 7 are connected to the communication control unit 1. The switch 7 switches an auto-receive mode and a manual receive mode which may be alternately selected each time the switch 7 is actuated.

In the present embodiment, the manual receive mode is selected while the facsimile machine is set in an auto-communication mode.

Figure 2:
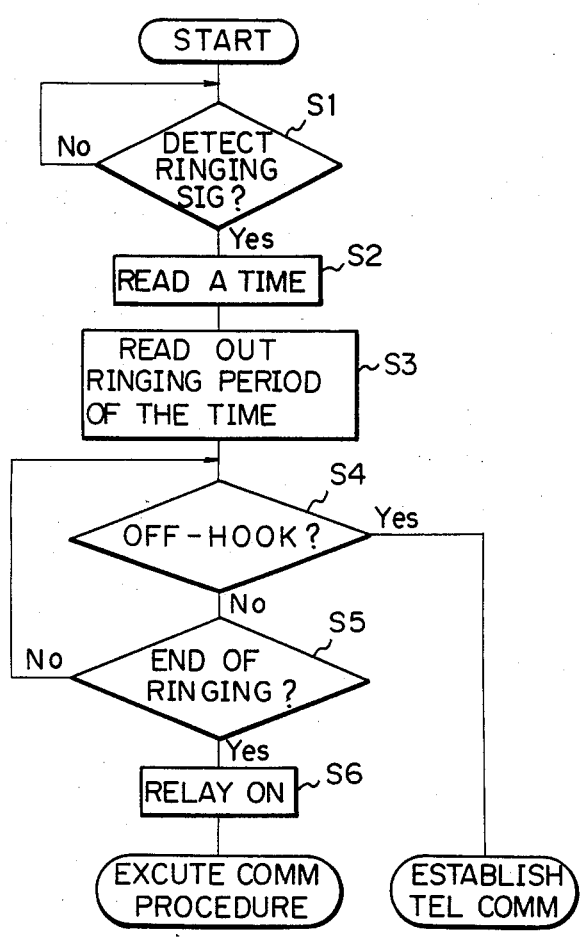
FIG. 2 is a flow chart showing a control procedure of a communication control unit of FIG. 1.

Referring to a flow chart of FIG. 2, the operation of the above apparatus is explained in detail.

When the manual receive mode has been selected by the switch 7, the following control is not effected and the telephone set 4 is connected to the line while the relay 6 selects the terminal B.

When the auto-receive mode has been selected by the switch 7, the control shown in FIG. 2 is effected. In a wait state, the relay 6 selects the terminal B.

In a step S1 of FIG. 2, an output of the ringing signal detection circuit 3 is checked to determine if a ringing signal has been received. If the ringing signal is detected, the process proceeds to a step S2 where the time of the clock 2 is read.

In a step S3, a ringing period of the telephone set 4 at the time read from the memory 8 in the step S2 is read out.

Two ringing periods, one for daytime and the other for night, are stored in the memory 8 in coded forms, because the probability that the operator is around the apparatus is high during the daytime and low at night. In the present invention, the relay 6 is not switched during the ringing period set in the memory 8 and the bell of the telephone set 4 is kept ringing for that period, waiting a response by the operator.

In a step S4, an output of the off-hook detection circuit 9 is checked to determine if the operator has taken the handset off-hook. If the operator takes the handset off-hook to respond, telephone communication is permitted.

In a step S5, whether or not the ringing period read in the step S3 has terminated is checked. Unless the ringing period has terminated, the bell continues to ring between the steps S4 and S4, waiting for a response by the operator.

When the termination of the ringing period is detected in the step S5, the process proceeds to a step S6 where the coil 5 is energized to switch the relay 6 to the terminal A to permit the communication procedure in the auto-receive mode.

Figure 3:
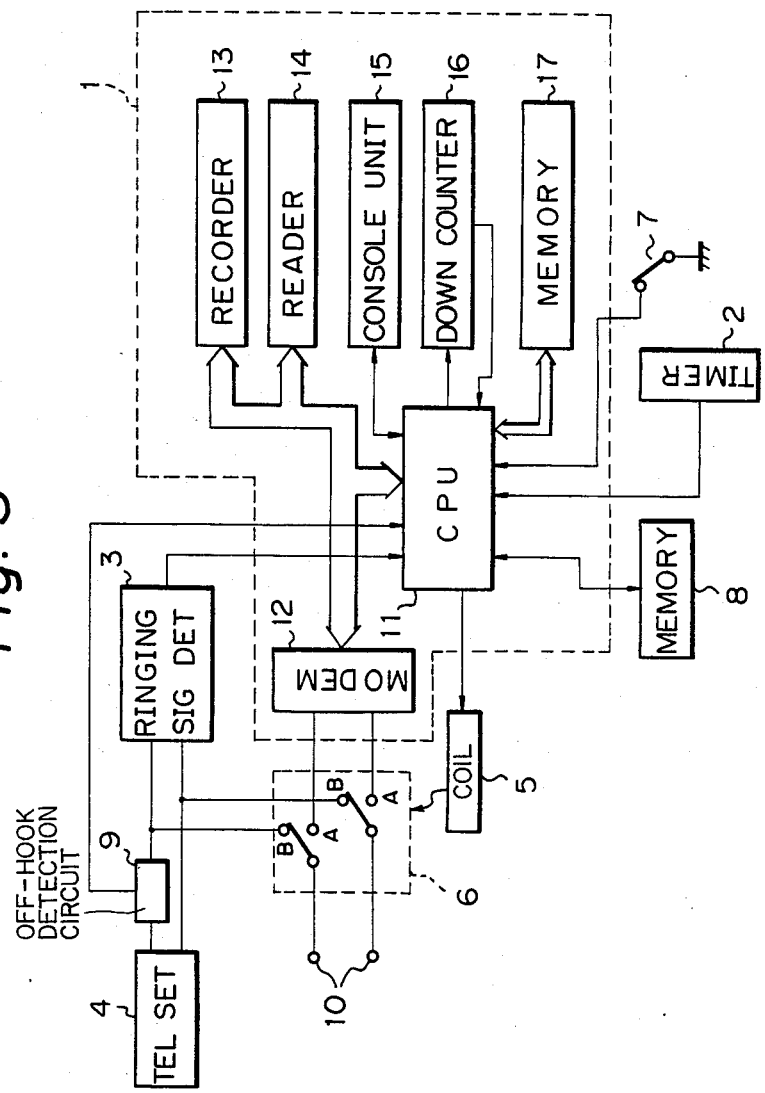
FIG. 3 is a detailed block diagram of FIG. 1.

FIG. 3 shows a detail of FIG. 1 and specifically shows a detail of the communication control unit 1. Numeral 11 denotes a microprocessor (CPU) which controls the overall facsimile machine. Numeral 12 denotes a modem which modulates and demodulates an image signal and a control signal to be received or transmitted. Numeral 13 denotes a recorder which records the image signal. Numeral 14 denotes a reader which reads a document. Numeral 15 denotes a console panel by which an operation of the facsimile machine is inputted. Numeral 16 denotes a count-down counter which counts down an initially set time set by the CPU 11 and supplies an end of count signal to the CPU 11 when the count reaches "0", and which may be a hardware counter or a software counter. Numeral 17 denotes a memory which stores a control program of the CPU 11 and the control procedure of the communication control unit 1 shown in FIG. 1.

Figure 4:
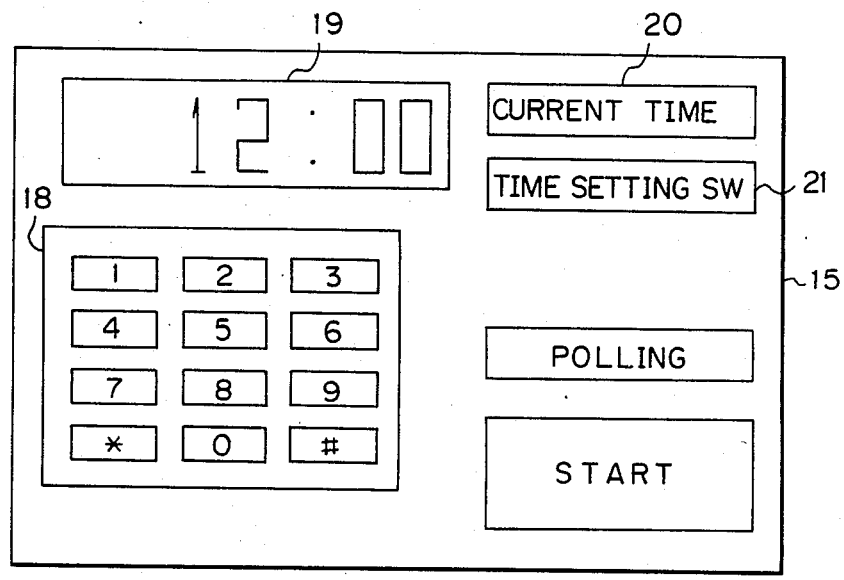
FIG. 4 is an external view of a console panel.

FIG. 4, shown an external view of the console panel 15. Numeral 18 denotes a ten button key-pad which enters the time and the ringing period. Numeral 19 denotes a display which displays the input time and which may be constructed by a known liquid crystal display. Numeral 20 denotes a current time display key. When the operator depresses the key 20, a current time is displayed on the display 19. Numeral 21 denotes a time setting key. When the operator depresses this key, a time setting mode is initiated to register a start time of an address region A, and end time of the address region A and the ringing period.

The registration of the time is explained with reference to a flow chart of FIG. 5 which shows a time registration procedure to the memory 8. This procedure is stored in the memory 17.

In a step M1, the key input is checked, and if the key input is detected, the process proceeds to a step M2 where the time setting mode is checked. If the time setting mode is detected, the process proceeds to a step M3, and if the time setting mode is not detected, an operation designated by the key input is effected.

In the step M3, "1" is set in a region register A which designates the address region. In a step M4, the start time is set by the operator, and in a step M5, the setting of the start time is checked and the process proceeds to a step M6.

In the step M6, the end time is set by the operator and in a step M7, the setting of the end time is checked and the process proceeds to a step M8. In the step M8, the ringing period is set by the operator and in a step M9, the setting of the ringing time is checked and the process proceeds to a step M10. In the step M10, the start time, end time and ringing period are stored in the region A of the memory 8 and the process proceeds to a step M11. In the step M11, whether the time setting has been completed and the standard mode has been restored is checked, and if it is the time setting mode, the process proceeds to a step M12 where the region register A is incremented by one and the process returns to the step M4 to carry out the time setting. If it is the standard mode, the time setting is terminated. In this manner, the time setting is carried out.

Figure 5:
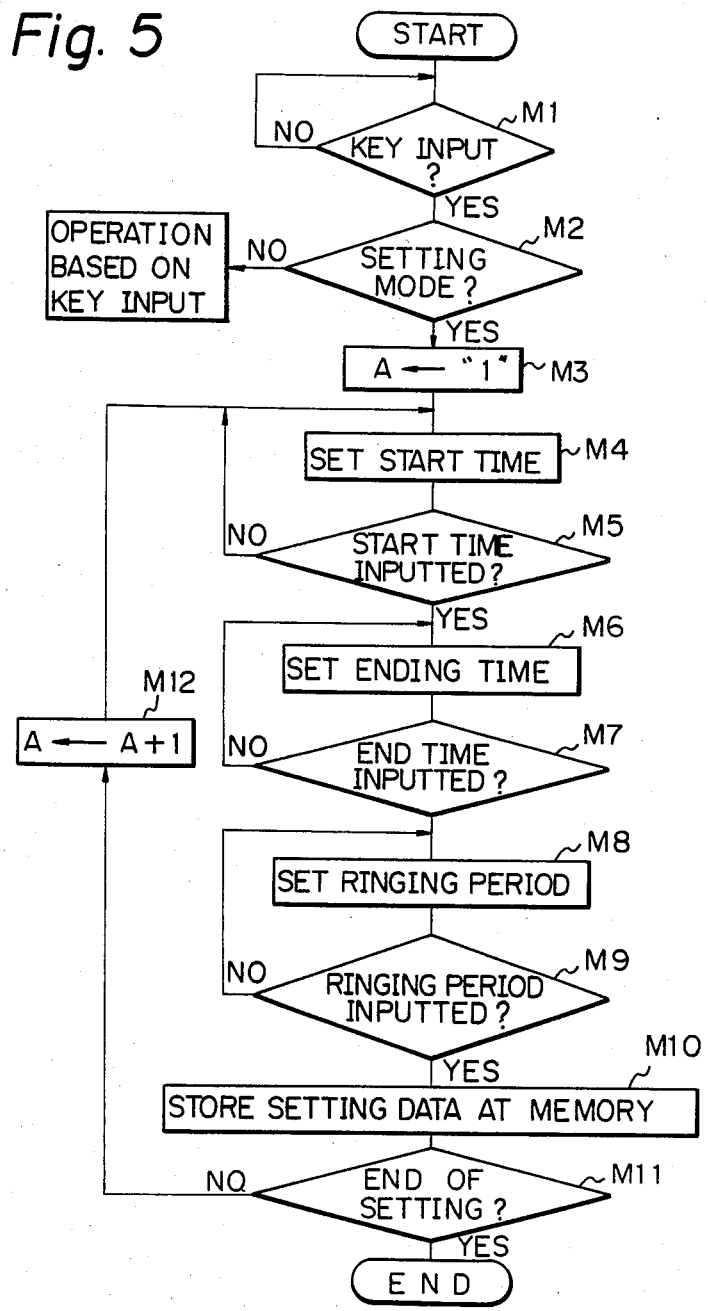
FIG. 5 is a flow chart showing a procedure for registering a time to a memory.

FIG. 6 shows a memory map of the memory 8, registered in accordance with the time registration procedure shown in FIG. 5.

In FIG. 6, the ringing period is 10 seconds for night and lunch time and 30 seconds for daytime. The times are registered starting from the address region 1 in the order of time. While the times and numerals are shown in FIG. 6 for ease of explanation, they are actually stored in the memory 8 in the binary form.

Figure 7B:
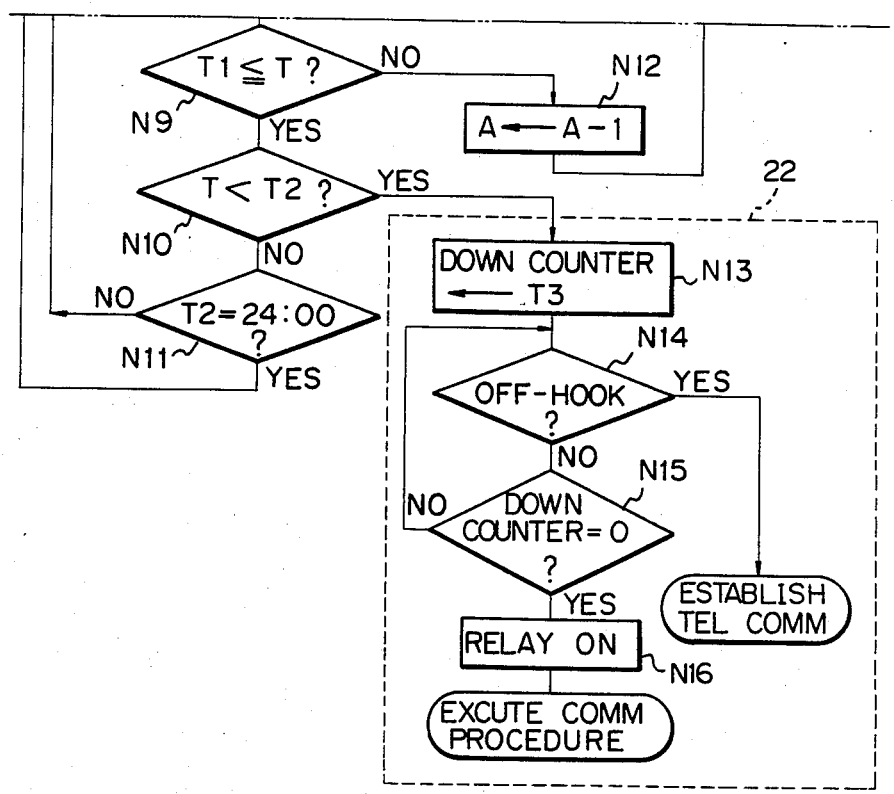

FIG. 7 is a detailed flow chart of FIG. 2. In a step N1, the output of the ringing signal detection circuit 3 is checked to determine whether the ringing signal has been received. If the ringing signal is detected, the process proceeds to a step N2 where the time of the clock 2 is read and set in a register T. In a step N3, the address region register A is set to "0". In a step N4, the address region register A is incremented by one and the process proceeds to a step N5. In the step N5, the content at the address region A of the memory 8 is read out and the process proceeds to a step N6. In the step N6, the start time of the address region A is set to a register T1, in a step N7, the end time of the address region A is set to a register T2. In a step N8, the ringing period is set to a register T3, and the process proceeds to a step N9. In the step N9, whether or not the content of the register T is no smaller than the content of the register T1 is checked, and if $T1 \leq T$, the process proceeds to a step N10, and if not $T1 \leq T$, the process proceeds to a step N12 where the address region register A is decremented by one, and the process returns to the step N5.

Since the times are registered starting from the address region 1 in the order of time, the process does not normally proceed to the step N12.

In the step N10, whether or not the content of the register T is smaller than the content of the register T2 is checked, and if $T < T2$, the process proceeds to a step N13, and if T is not less than T2, the proceeds proceed to a step N11 where whether or not the time set in the register T2 is 24:00 is checked, and if it is 24:00, the process returns to the step N3 and if it is not 24:00, the process returns to the step N4. The steps N4 to N11 are repeated until the time band of the current time is detected.

If the time band of the current time is detected, the process proceeds to a step N13 where the content of the register T3 which stores the ringing period for the detected time band is set to the count-down counter 16 and the process proceeds to a step N14.

In the step N14, the output of the off-hook detection circuit 9 is checked to determine if the operator has taken the handset off-hook. If the operator has taken the handset off-hook to respond, the telephone communication is allowed to continue. In a step N15, whether or not the count-down of the counter 16 has been terminated is determined, and if it has not been terminated, the bell is rung in the steps S4 and S5 to request the response by the operator. If the count-down of the counter 16 has been terminated, the process proceeds to a step N16 where the coil 5 is energized to switch the relay 6 to the terminal A to carry out the communication procedure in the auto-receive mode.

In this manner, in the auto-receive mode, the bell is rung for the predetermined ringing period determined by the time band, requesting the response by the operator. Accordingly, even if the auto-receiver mode is inadvertently held, the manual receive mode is initiated.

Figure 8A:
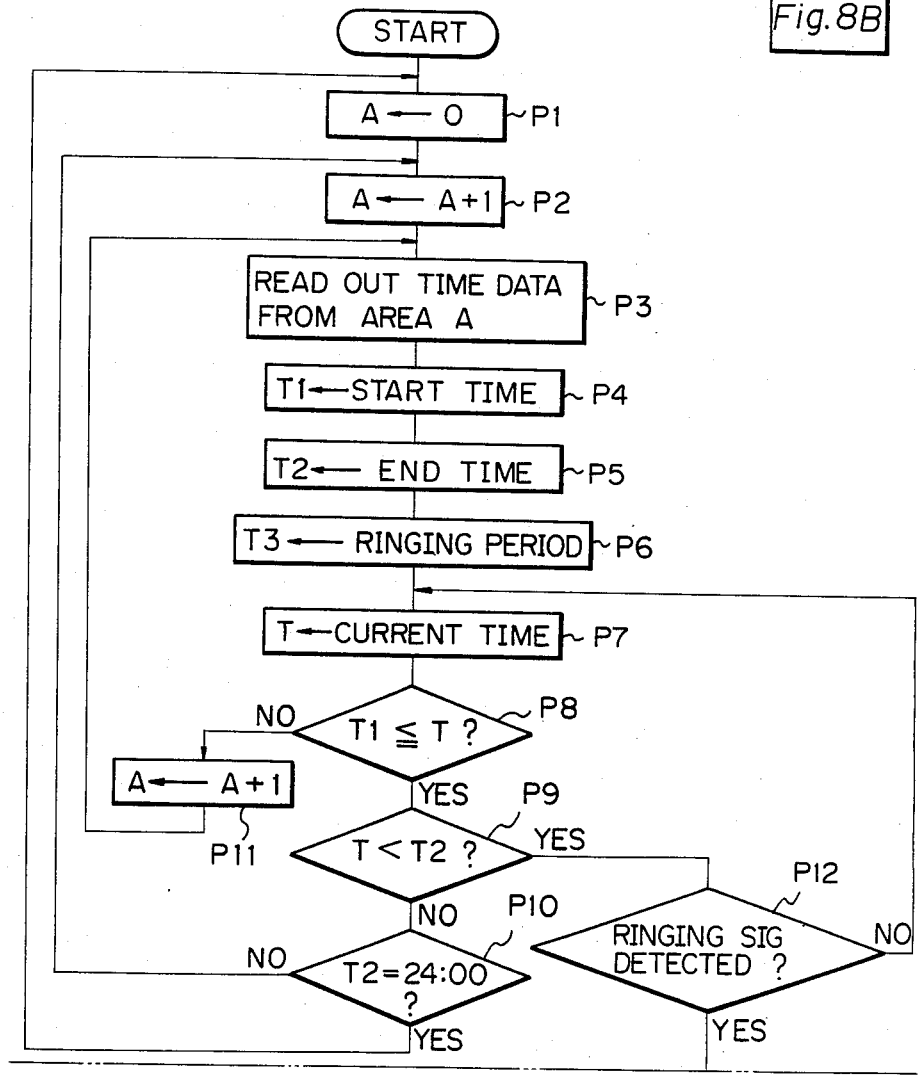
Figure 8B:
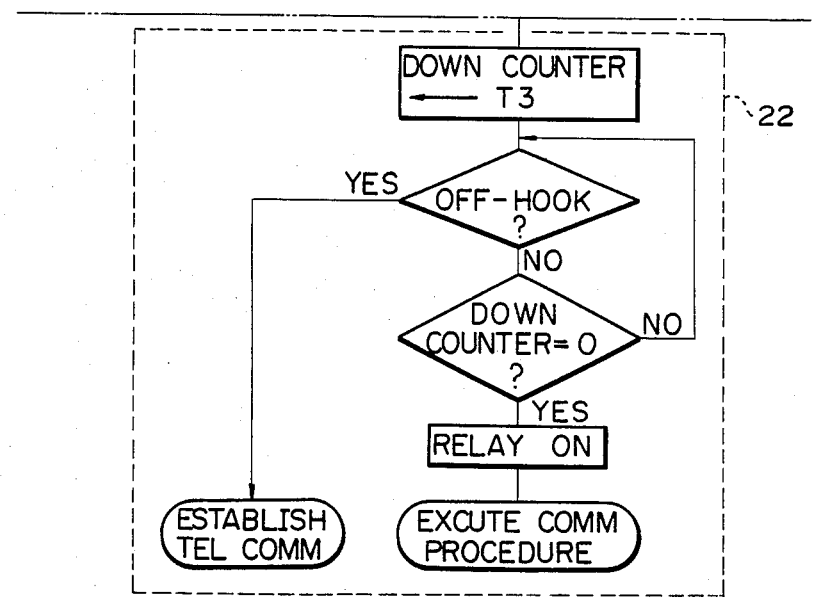

FIG. 8 shows a control procedure in another embodiment. The control procedure of FIG. 8 is stored in the memory 17. In a step P1, the address region register A is set to "0". In a step P2, the address region register A is incremented by one. In a step P3, the content at the address region A of the memory 8 is read out and the process proceeds to a step P4. In the step P4, the start time of the address region A is set to the register T1. In a step P5, the end time of the address region A is set to the register T2. In a step P6, the ringing period is set to the register T3, and the process proceeds to a step P7.

In the step P7, the time of the clock 2 is read out and set to the register T, and the process proceeds to a step P8.

In the step P8, whether or not the content of the register T is no smaller than the content of the register T1 is checked, and if T1≦T, the process proceeds to a step P9, and if T1 is not less than or equal to T, the process proceeds to a step P11 where the address region register A is decremented by one and the process returns to the step P3.

Since the registration of the time is carried out starting from the address region 1 in the order of time, the process does not normally proceed to the step P11.

In the step P9, whether or not the content of the register T is smaller than the content of the register T2 is checked, and if T<T2, the process proceeds to a step P12, and if T is not less than T2, the process proceeds to a step P10 where whether or not the time set in the register T2 is 24:00 is checked, and if it is 24:00, the process returns to the step P1, and if it is not 24:00, the process returns to the step P2.

In the step P12, the output of the ringing signal detection circuit 3 is checked to determine whether the ringing signal has been received. If the ringing signal is detected, the process proceeds to the step 22 of FIG. 7, and if it is not detected, the process returns to the step P7.

In the control procedure of the other embodiment shown in FIG. 8, the CPU 11 always detects the time band for the current time. In accordance with the embodiment of FIG. 8, the mode change by the time is permitted by registering the communication mode information corresponding to the time band in the memory 8.

Figures 9, 9A, 9B:
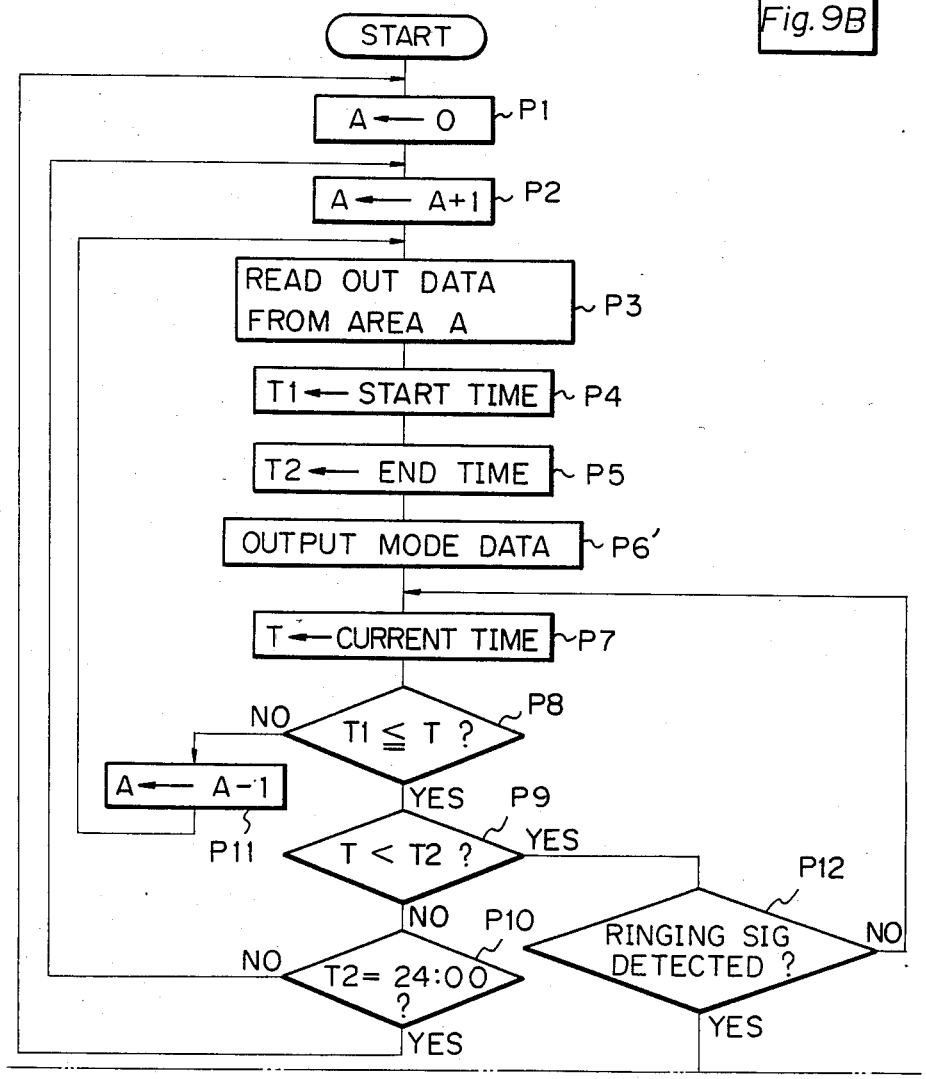
FIGS. 9, 9a, 9b shows a flow chart showing a control procedure of another embodiment of the present invention.
Figure 9B:
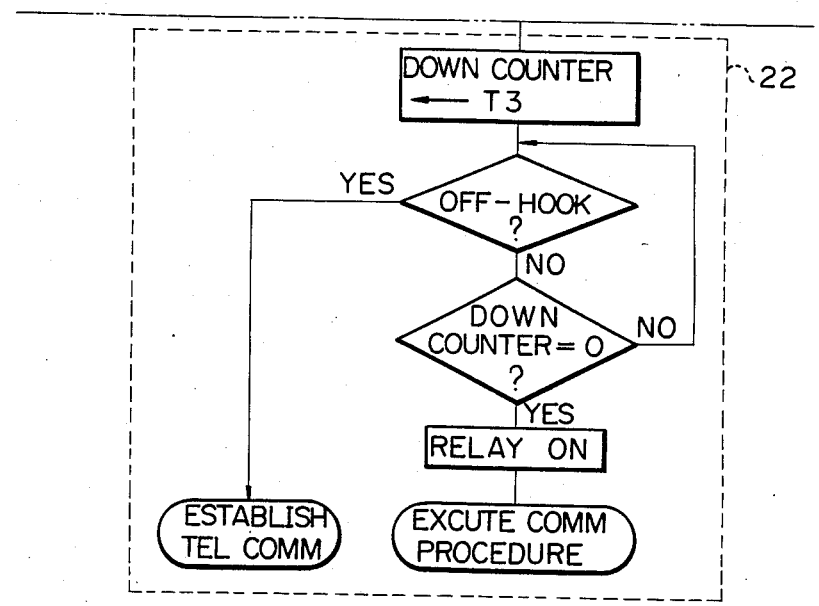

As shown in FIG. 9, the mode information registered in the memory 8 may be read out in the step P6 of FIG. 8 instead of setting the ringing period to the register T3 so that the communication mode is set by the time band.

FIG. 10 shows a memory map of the memory 8 in the embodiment of Fig. 9 in which the communication mode is set by the time band. The communication mode "0" indicates the auto-receive mode and "1" indicates the manual receive mode.

The auto-receive mode and manual receive mode are mere examples of other communication mode information such as communication rate mode and high quality mode may be registered to set the mode by the time band.

The present invention is not limited to a facsimile machine but it may also be applied to mode switching in any communication apparatus which utilizes a telephone line.

What is claimed is:

1. A communication apparatus comprising:
   data communication means for performing data communication;
   speech communication means for performing speech communication;
   switching means, connected to said data communication means and speech communication means, for switching between operations of said data communication means and said speech communication means;
   time band setting means for setting a time band;
   ringing signal detection means for detecting a ringing signal from a calling party; and
   control means for controlling, after a predetermined period of time when said ringing signal detection means detects the ringing signal, said switching means such that said switching means switches from the operation of said speech communication means to the operation of said data communication means,
   wherein the predetermined period of time is varied in accordance with the time band set by said time band setting means.

2. An apparatus according to claim 1, further comprising operation detection means for detecting the operation of said speech communication means, and wherein, when said operation detection means detects the operation of said speech communication means within the predetermined period of time, said switching means does not switch the operation of said speech communication means to the operation of said data communication means.

3. An apparatus according to claim 1, wherein said time band setting means comprises memory means for storing a plurality of time bands and a timer means for counting time.

4. An apparatus according to claim 2, wherein said speech communication means includes a telephone handset, and said operation detection means detects an off-hook state of said telephone handset.

5. An apparatus according to claim 1, wherein said data communication means includes facsimile communication means.

6. A communication apparatus comprising:
   data communication means for performing data communication;
   speech communication means for performing speech communication;
   operation means for effecting operation of said apparatus;
   ringing signal detection means for detecting a ringing signal from a calling party;
   switching means, connected to said data communications means and to said speech communication means, for switching operations of said data communication means and said speech communication means; and
   control means, responsive to said operating means, for controlling, after a predetermined period of time when said ringing signal detection means detects the ringing signal, said switching means such that said switching means switches from the operation of said speech communication means to the operation of said data communication means,
   wherein the predetermined period of time is set by said operation means.

7. An apparatus according to claim 6, wherein a time band corresponding to the predetermined period of time is set by said operation means, and said control means varies the predetermined period of time in accordance with the time band.

8. An apparatus according to claim 7, further comprising timer means for counting time, and wherein said control means selects the predetermined period of time in accordance with the time band set by the operation.

9. An apparatus according to claim 6, further comprising operation detection means for detecting the operation of said speech communication means, and wherein, when said operation detection means detects the operation of said speech communication means within the predetermined period of time, said switching means does not switch from the operation of said speech communication means to the operation of said data communication means.

10. An apparatus according to claim 6, wherein said data communication means includes facsimile communication means.

* * * * *

UNITED STATES PATENT AND TRADEMARK OFFICE
CERTIFICATE OF CORRECTION

PATENT NO. : 4,663,778

DATED : May 5, 1987

INVENTOR(S) : MASATOMO TAKAHASHI

It is certified that error appears in the above-identified patent and that said Letters Patent is hereby corrected as shown below:

COLUMN 1

Line 16, "and" should read --to--.

COLUMN 2

Line 61, "a" should read --for a--.

COLUMN 4

Line 7, "lunch time" should read --lunchtime--.
    Line 39, "proceeds proceed" should read
        --process proceeds--.
    Line 67, "auto-receiver" should read
        --auto-receive--.

COLUMN 5

Line 57, "of" should read --and--.

UNITED STATES PATENT AND TRADEMARK OFFICE
CERTIFICATE OF CORRECTION

PATENT NO. :    4,663,778

DATED       :    May 5, 1987

INVENTOR(S) :   MASATOMO TAKAHASHI

Page 2 of 2

It is certified that error appears in the above-identified patent and that said Letters Patent is hereby corrected as shown below:

COLUMN 6

Lines 50-51, "communications" should read

-- communication --.

Signed and Sealed this

Fifteenth Day of September, 1987

*Attest:*

DONALD J. QUIGG

*Attesting Officer*    *Commissioner of Patents and Trademarks*